(12) United States Patent  
Balsells

(10) Patent No.: US 7,316,593 B2
(45) Date of Patent: Jan. 8, 2008

(54) ELECTRICAL CONNECTOR WITH EMBEDDED CANTED COIL SPRING

(75) Inventor: Peter J. Balsells, Newport Beach, CA (US)

(73) Assignee: Bal Seal Engineering Co., Inc., Lake Forest, CA (US)

( * ) Notice: Subject to any disclaimer, the term of this patent is extended or adjusted under 35 U.S.C. 154(b) by 0 days.

(21) Appl. No.: 11/383,529

(22) Filed: May 16, 2006

(65) Prior Publication Data

US 2007/0042648 A1 Feb. 22, 2007

Related U.S. Application Data

(60) Provisional application No. 60/682,644, filed on May 19, 2005.

(51) Int. Cl.
H01R 13/33 (2006.01)

(52) U.S. Cl. ................................ 439/827; 439/840

(58) Field of Classification Search ................ 439/827, 439/846, 840, 841
See application file for complete search history.

(56) References Cited

U.S. PATENT DOCUMENTS

| 5,203,849 A * | 4/1993 | Balsells ...................... 267/1.5 |
| 5,545,842 A * | 8/1996 | Balsells ...................... 174/372 |
| 6,749,358 B2 * | 6/2004 | Balsells ...................... 403/316 |
| 6,966,802 B2 * | 11/2005 | Hielscher et al. ........... 439/841 |

* cited by examiner

Primary Examiner—Tho D. Ta
Assistant Examiner—Vanessa Girardi
(74) Attorney, Agent, or Firm—Walter A. Hackler

(57) ABSTRACT

A female electrical connector and method of using same includes a body having a bore therethrough for receiving electrical plug and a helical groove formed in the bore. A canted coil spring is disposed in the helical groove and protrudes therefrom for providing both electrical connection to the plug and retention of the plug within the bore and a connecting lug embedded into the body, surrounding the bore and interconnected with the spring includes a wire segment extending exterior to the body.

3 Claims, 2 Drawing Sheets

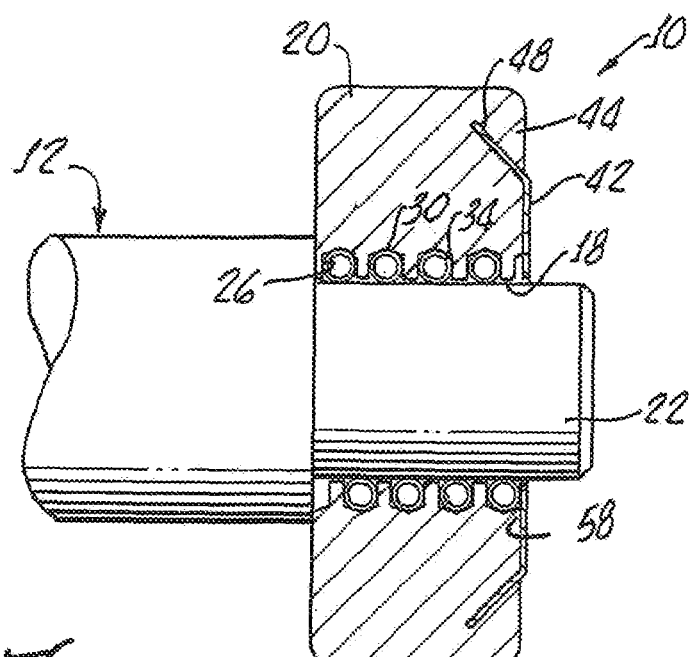
_Fig. 1._
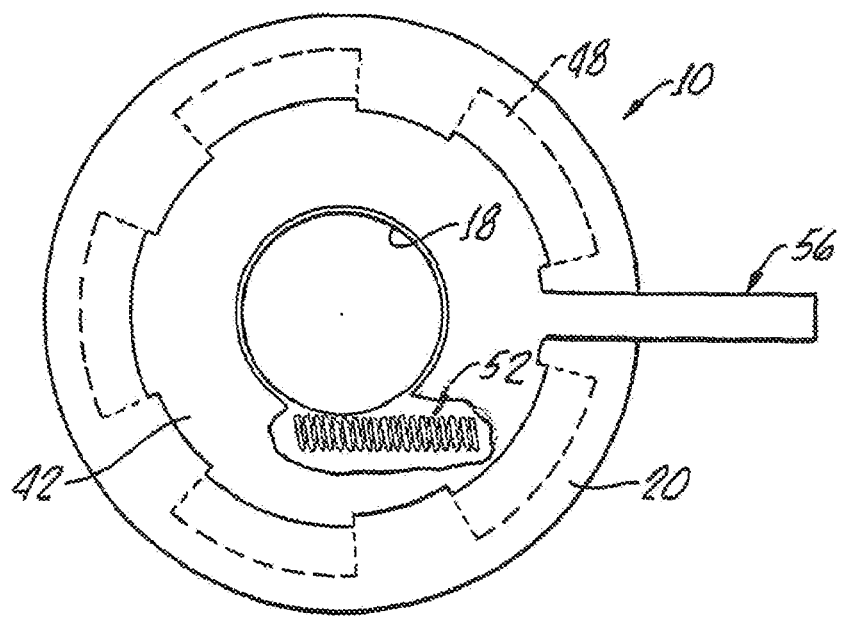
_Fig. 2._

ELECTRICAL CONNECTOR WITH EMBEDDED CANTED COIL SPRING

The present application claims priority from U.S. Ser. No. 60/682,644 filed May 19, 2005 which is to be incorporated herein, in its entirety, by this specific reference thereto.

Electrical connectors provide the mechanical and electrical interface between two mating parts. In general, they all have the same requirements, i.e., low resistivity and robust mechanical connective properties to withstand the environment. The resistance is a function of the number of contact points, surface condition, and the normal force at the point of contact. The normal force must be high enough to break through any surface film but not so high that it impedes the connection. A scraping or cleaning action is also desirable as an aide to oxide or surface film removal.

It is also highly desirable to have a connecting device that will operate over a wide range of tolerances and surface eccentricities without degrading electrical performance. And of course, cost and size are usually important considerations as well in addition to maintaining high conductivity in a high vibration environment.

A number of techniques have been developed for conductors. In general, they employ various types of louvers or baskets to provide multiple contact points with adequate normal force levels. U.S. Pat. No. 3,107,966, Bonhomme, teaches a wire basket. U.S. Pat. No. 4,720,157, Nestor, teaches the use of strip springs. U.S. Pat. No. 3,980,387, Neidecker, teaches the use of louvered sheet metal. In all three, the normal force is furnished by the spring action of the basket, strip or louver. The normal force applied by the device is a function of the amount of deflection of the individual elements.

This invention replaces the louvers, wire baskets, and the strip springs with a canted coil spring mounted in a helical groove in a connector housing. The canted coil spring provides multiple contact points with the male portion of the connector. The housing can be molded from an insulting material or fabricated from a conductive material depending upon the end use of the connector. The spring can be fabricated from a variety of metal alloy such as platinum iridium. The spring can be plated to enhance conductivity. The canted coil spring has the advantage of nearly constant force over a wide deflection range so that the connector can accommodate a wide tolerance range as well as surface eccentricities. The axial spring has excellent surface film removal qualities, particularly by spring design. The ability to use the canted coil spring permits a very high contact point density permitting a more compact connector than other techniques.

SUMMARY OF THE INVENTION

A female electrical connector in accordance with the present invention generally includes a body having a bore therethrough for receiving an electrical plug along with a helical groove formed in the bore.

A canted coil spring is disposed in the helical groove and protrudes therefrom in order to provide both electrical connection to the plug and to retain the plug within the bore.

A connecting lug is embedded into the body which surrounds the bore and is interconnected with the spring and further includes a wire segment extending exterior to the body in order to provide electrical communication from an exterior source through the lug coil spring and plug.

The body may be formed from a non-conductive material and the groove may be flat, V-bottom, or have a tapered bottom. These various groove configurations may be utilized with either radial canted coil springs or axial canted coil springs depending upon the desired force characteristics both retaining the plug within the bore and for establishing and maintaining electrical continuity.

Utilizing the structure of the present invention, a method of providing electrical connection to an electrical plug in accordance with the present invention includes providing a female electrical connector consisting of a body having a bore therethrough for receiving the electrical plug along with a helical groove formed in the bore.

A canted coil spring is provided and disposed in the helical groove and protrudes therefrom for providing electrical connection to the plug and retention of plug within the bore and a connecting lug is embedded into the body which surrounds the bore and is interconnected with the spring and further includes a wire segment extending exterior to the body.

The method in accordance with the present invention is completed by inserting the plug into the bore with the spring retaining the plug and the bore and providing electrical connection therewith.

BRIEF DESCRIPTION OF THE DRAWINGS

The advantages and features of the present invention will be better understood by the following description when considered in conjunction with the accompanying drawings, in which:

FIG. 1 is a cross sectional view of the female connector in accordance with the present invention generally showing a body having a bore therethrough for receiving an electrical plug along with a helical groove formed in the bore, a canted coil spring disposed in the helical groove and an embedded connecting lug;

FIG. 2 is an end view of the connector shown in FIG. 1 more clearly illustrating a spring length welded to the embedded conductive lug along with a wire segment extending exterior to the body;

DETAILED DESCRIPTION

Figure 3:
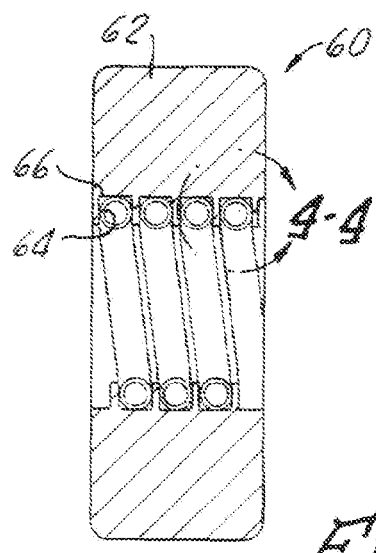
FIGS. 3 and 4 illustrate an alternative embodiment of the present invention in which the groove includes a flat bottom.

With reference to FIGS. 1 and 2, there is shown a female electrical connector 10 in accordance with the present invention shown with a male connector, or plug, 12 shown in dashed line inserted through a bore 18 in a body 20 of the connector 10, the bore 18 being sized for receiving the lug 12 by way of a plug head 22.

The body 20 is preferably formed from an insulating material and a helical groove 26 is formed with a bore 18. In the embodiment 10, the groove includes a V-bottom 30 and canted coil spring is disposed in the groove 26 with an exposed portion 38 contacting the plug head 22 and providing sufficient force thereagainst to retain the plug head 22 within the bore 18.

A connecting lug 42 is provided and preferably disposed on an end 44 of the body 20 and is preferably secured therein by lug ends 48 embedded into the body 20.

As shown in FIG. 1 and broken away FIG. 2, the spring 34 includes a length 52 welded to the connecting lug 42 which surrounds the bore 18 and the connecting lug 42 includes a wire segment 56 extending exterior to the body 20. As shown in FIG. 1 and broken away FIG. 2, the length 52 of spring 34 is welded to an inside surface 58 of the connecting lug 48, the weld 58 providing a structural and electrical connection between the spring 34 and the connecting lug 48.

Figure 4:
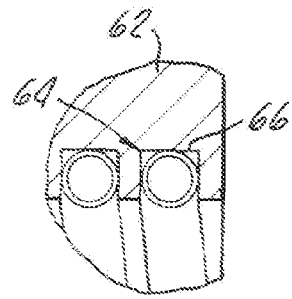

FIGS. 3 and 4 illustrate alternative embodiment 60 in accordance with the present invention which includes a body 62 having a helical groove 64 with a flat bottom 66.

Figure 5:
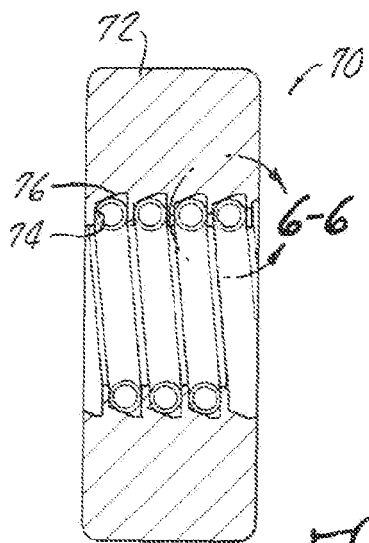
FIGS. 5 and 6 illustrate yet another embodiment of the present invention which includes a helical groove having a tapered bottom.
Figure 6:
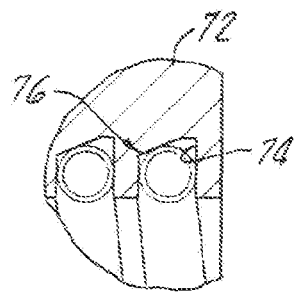

Alternatively, as shown in FIGS. 5 and 6, an embodiment 70 in accordance with the present invention may include a body 72 having a helical groove 74 with a tapered bottom 76.

Figure 7:
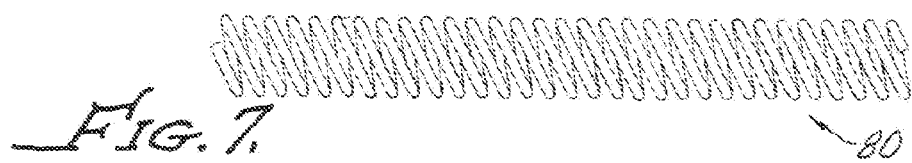
FIG. 7 is a plan view of an axial spring length suitable for the present invention.
Figure 8:
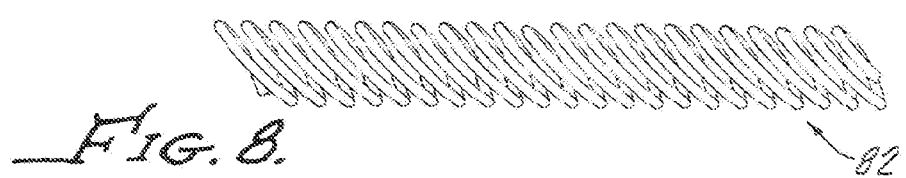
FIG. 8 is a plan view of a radial spring length suitable for use in the present invention.

Either an axial spring 80, as shown in FIG. 7, or a radial spring 82 shown in FIG. 8 may be disposed in the grooves 26, 64, 74 with the various groove 26, 64, 74 configurations, the insertion and retention force requirements coupled with the electrical properties will determine the specific design of the spring, spring length and material be it radial or axial.

In addition, the insertion and holding forces are determined by the spring design and material. A complete description of the radial and axial springs suitable for use in the present invention and the groove configurations for determining insertion and holding forces are set forth in U.S. Pat. Nos. 4,893,795, 4,876,781, 4,974,821, 5,108,078, 5,139,243, 5,139,276, 5,082,390, 5,091,606, 5,411,348, 5,545,842, 5,615,870, 5,709,371 and 5,791,638 all to Balsells. All of these patents are to be incorporated herewith in their entirety including all specifications and drawings for the purpose of describing radial and canted coil axial springs, groove, and force consideration.

Although there has been hereinabove described a specific electrical connector with embedded canted coil spring in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

The invention claimed is:

1. A female electrical connector consisting of:
    a body having a bore therethrough for receiving an electrical plug, said body being formed from a non-conductive material;
    a helical groove formed in said bore;
    a canted coil spring disposed in said helical groove and protruding therefrom for providing both electrical connection to the plug and retention of the plug within said bore; and
    a connecting lug disposed on said body, surrounding said bore, welded to the spring and having a wire segment extending exterior to said body, said connecting lug having ends embedded in said body to affix said connecting lug to an end of said body.

2. The connector according to claim 1 wherein the interconnection between said spring and said lug is within said body and on an inside surface of said lug.

3. The connector according to claim 1 wherein said bore is circular in cross section.

* * * * *